No. 859,337.
PATENTED JULY 9, 1907.
G. W. RUHL.
WHEEL.
APPLICATION FILED MAR. 28, 1906.
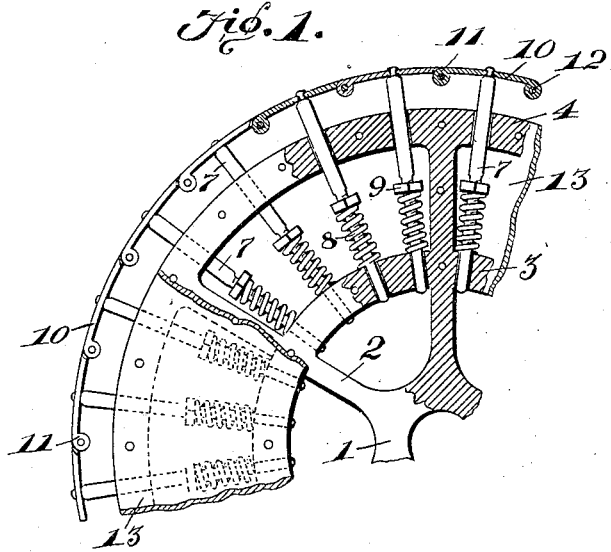
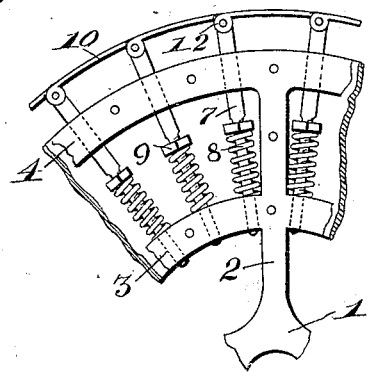
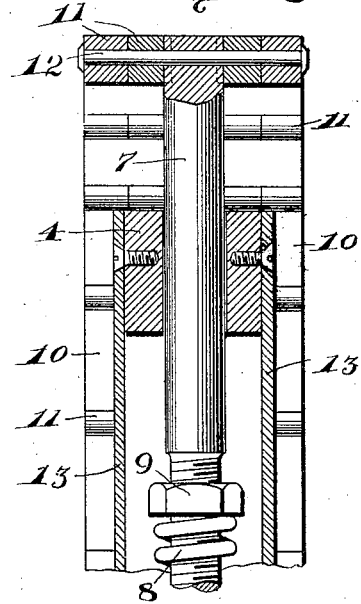
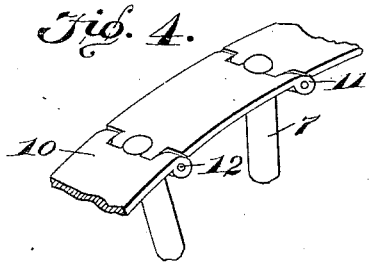
WITNESSES:
George W. Ruhl,
INVENTOR.
By C. A. Snow & Co.
ATTORNEYS

UNITED STATES PATENT OFFICE.

GEORGE WILLIAM RUHL, OF RACINE, MINNESOTA.

WHEEL.

No. 859,337.

Specification of Letters Patent.

Patented July 9, 1907.

Application filed March 28, 1906. Serial No. 308,528.

*To all whom it may concern:*

Be it known that I, GEORGE WILLIAM RUHL, a citizen of the United States, residing at Racine, in the county of Mower and State of Minnesota, have invented a new and useful Wheel, of which the following is a specification.

This invention relates to vehicle wheels and has for its object to provide for cushioning the same in a new and novel manner so as to obviate the disadvantages of pneumatic tires.

While the wheel is capable of general application, it is particularly designed for use in connection with motor vehicles.

With these and other objects in view the present invention consists in the combination and arrangement of parts as will be hereinafter more fully described, shown in the accompanying drawings, and particularly pointed out in the appended claims, it being understood that changes in the form, proportion, size and minor details may be made within the scope of the claims, without departing from the spirit or sacrificing any of the advantages of the invention.

In the drawings, Figure 1 is a fragmentary elevation of a portion of a wheel embodying the features of the present invention, parts being broken away to disclose the mounting of endwise yieldable spokes. Fig. 2 is a view similar to Fig. 1 showing a slightly different arrangement of the yieldable spokes. Fig. 3 is an enlarged fragmentary sectional view of the arrangement shown in Fig. 2. Fig. 4 is a fragmentary perspective view of the tire arrangement shown in Fig. 2. Fig. 5 is a view similar to Fig. 2 showing the emergency springs for the yieldable spokes.

Like characters of reference designate corresponding parts in each of the figures of the drawings.

The persent wheel includes a frame made up of a hub 1 having radial arms 2, each carrying inner and outer concentric rims 3 and 4, all of which are rigidly connected. The rims are provided with corresponding radially disposed openings 5 and 6, in each pair of which works a spoke 7 which is maintained at its outer limit by means of a helical spring 8 embracing the spoke and bearing at its inner end against the inner rim 3 and at its outer end against a nut 9 adjustably threaded upon the spoke for varying the tension of the spring.

The tire of the wheel is made up of a series of relatively short metallic plates 10, the ends of which are provided with corresponding eyes or knuckles 11 receiving a pivot pin 12, whereby the successive plates are hinged to one another.

As embodied in Fig. 1 it will be seen that each spoke is connected to the middle of the adjacent tire section or plate 10, whereby the hinged joints come between the spokes. In Figs. 2, 3 and 4, the pivot pin 12 is carried by the outer end of the spoke, as by piercing the same which brings the hinged joint directly at the spoke.

For the purpose of preventing the lodgment of dirt and the like upon the helical springs, metallic plates 13 are suitably secured to the inner and outer rims 3 and 4 at opposite sides of the wheel so as to effectually house the springs. This manner of housing the springs not only prevents the accumulation of dirt and the like thereon, but also protects the same from the effects of the weather and therefore maintains the springs in proper working condition.

From the foregoing description, it will be understood that the tire 10 is yieldably mounted upon the rigid frame of the wheel through the medium of the endwise movable spokes and the springs, whereby the tire is capable of yielding without affecting the rigid frame of the wheel which is of course cushioned and thereby relieved of sudden jars.

In the arrangement shown in Fig. 5 of the drawings, the hub 1 and the inner rim 3 are connected by supplemental arms 14 which produce radial sockets 15 in which the inner ends of the spokes work. Adjoining the inner end of each socket there is a helical spring 16, the inner end of the spring being suitably connected to the hub and its outer end terminating short of the inner end of the spoke which is provided with a head 17. Under normal conditions the yieldable spokes do not strike the springs 16, but when the vehicle is overloaded, the spokes engage with the springs 16 which then form emergency cushioning devices so as to prevent undue compression of the spring 8.

It is preferred to have the spokes normally out of engagement with the emergency springs 16, for if such springs were normally engaged with the spokes the wheel would be too stiff.

Having thus described the invention, what is claimed is:—

1. A wheel comprising a frame having inner and outer rims provided with radial spoke openings, yieldable spokes mounted to operate in said openings of the rims, springs arranged between the rims each having one end engaging the inner rim, abutments carried by the spokes and bearing against the outer ends of the springs, oppositely arranged annular casings connecting the inner and outer rims and inclosing the said springs, and a flexible tire carried by the outer ends of the spokes embodying a series of plates having their ends pivotally connected to turn in the plane of rotation of the wheel, the plates being operatively connected to the spokes.

2. A wheel comprising a frame including inner and outer rims connected by radial arms, the rims being provided with corresponding radial openings, spokes working endwise through the openings and projecting beyond the outer rim, abutments upon the spokes within the rims, springs bearing in opposite directions against the abutments and the inner rim, emergency cushioning devices arranged on the frame in the path of the inner ends of the spokes, and a flexible tire carried by the outer ends of the spokes.

3. A wheel comprising a frame including inner and outer rims connected by radial arms and provided with corresponding radial openings, spokes working endwise through corresponding openings, abutments from the spokes between the rims, springs embracing the spokes and bearing in opposite directions against the abutments and the inner rim, annular cover plates secured to the rims and inclosing the space between them to form a housing for the springs, and a tire made up of a series of pivotally connected sections carried by the outer ends of the spokes.

In testimony that I claim the foregoing as my own, I have hereto affixed my signature in the presence of two witnesses:

GEORGE WILLIAM RUHL.

Witnesses:
C. F. GREENING,
E. F. GREENING.